June 25, 1963     E. MITTELMANN     3,094,870

FLOWMETER

Filed Dec. 26, 1956

Inventor
Eugene Mittelmann
by Pringley, Clayton & Vogel
Attorneys

United States Patent Office 3,094,870
Patented June 25, 1963

3,094,870
FLOWMETER
Eugene Mittelmann, 427 W. Wrightwood, Chicago, Ill.
Filed Dec. 26, 1956, Ser. No. 630,517
7 Claims. (Cl. 73—194)

This invention relates to an apparatus for measuring the flow of fluids and more particularly to electromagnetic type flowmeters.

Electromagnetic type flowmeters have been used heretofore for measuring the rate of flow of fluids. Such flowmeter includes a conduit or pipe usually circular in cross section through which the fluid flows. A magnetic field is established across the fluid stream so that the fluid threads at right angles the force lines of the exciting magnetic field. Electrodes are placed diametrically across the pipe and are used to detect the voltage induced in the fluid by flow through the exciting magnetic field. The voltage induced in the electrodes is proportional to the velocity of the fluid and to the intensity of the exciting magnetic field.

The present invention has particular use in those flowmeters wherein the exciting magnetic field is induced by an A.C. voltage. In such instruments the signal induced in the electrodes is an A.C. voltage proportional to the velocity of the fluid and the intensity of the exciting magnetic field and is also in phase with the magnetic field.

Instruments of this type used heretofore have required individual calibration and have depended upon external sources of reference such as standard sources of potential for calibration. Other instruments of this type used heretofore have incorporated therein expensive linear amplifying circuits and other expensive circuit elements when a high degree of accuracy is desired. Such instruments also have had serious errors introduced therein when variations occurred in the voltage for the exciting magnetic field and when variations occurred in the magnetic properties of the associated magnetic members. To compensate for these latter errors, relatively complicated stabilizing and compensating circuits have been used.

Accordingly, it is an important object of the present invention to provide an improved electromagnetic flowmeter and more particularly an electromagnetic flowmeter which is absolute in character.

In conjunction with the foregoing object, it is another object of the invention to provide a flowmeter of the type set forth in which the calibration thereof depends only on the physical constants of the instrument and not upon external standards of reference and particularly standard sources of voltage.

Another object of the invention is to provide a more accurate flowmeter of the type set forth.

Still another object of the invention is to provide an electromagnetic flowmeter which is independent of variations in the voltage source for the exciting magnetic field and in the exciting current.

Yet another object of the invention is to provide an electromagnetic flowmeter of the type set forth which is substantially independent of variations in the ambient temperature and which is independent of variations in the magnetic properties of the exciting magnet and other component parts.

Still another object of the invention is to provide an improved electromagnetic flowmeter of the type set forth which is more simple in construction and operation and less expensive in construction and operation.

In conjunction with the foregoing object, it is a further object of the invention to provide an improved electromagnetic flowmeter which uses standard simple parts including simple non-linear amplifying circuits.

These and other objects and advantages of the invention will be better understood from the following description when taken in conjunction with the accompanying drawing. In the drawing wherein like reference numerals have been utilized to indicate like parts throughout:

Figure 3:
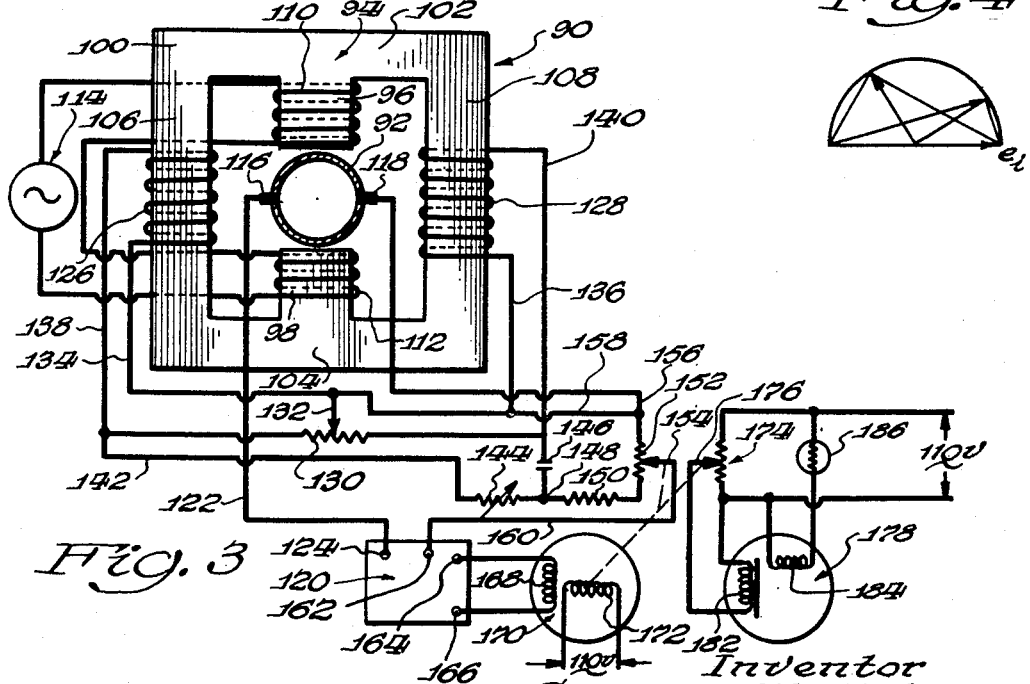
Figure 4:
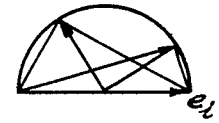

FIGURE 3 is a diagrammatic view of a modified form of a flowmeter made in accordance with and incorporating therein the principles of the present invention, this flowmeter including an automatic totalizing and recording apparatus; and FIGURE 4 is a vector diagram illustrating the fact that a constant amplitude signal of any desired phase can be obtained from the integrating circuit forming a part of the form of invention shown in FIGURE 3 of the drawing.

Figure 1:
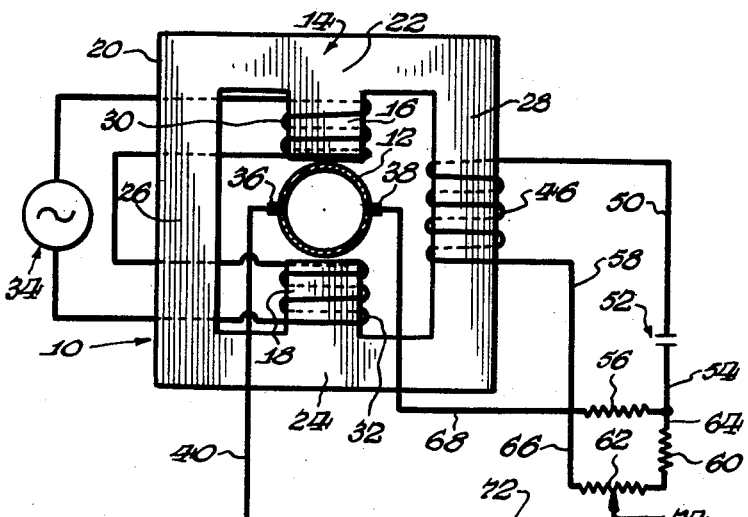
FIGURE 1 is a schematic view of an electromagnetic flowmeter made in accordance with and embodying the principles of the present invention.

Referring to the drawing and particularly to FIGURE 1 thereof there is shown a flowmeter generally designated by the numeral 10 made in accordance with and embodying the principles of the present invention. Flowmeter 10 includes a pipe or conduit 12 formed of non-magnetic material such as a suitable plastic to confine the fluid stream being measured. Pipe 12 has been shown in cross section and is illustrated as being circular in shape. Disposed about pipe 12 is an electromagnet generally designated by the numeral 14. Electromagnet 14 includes a pair of poles 16 and 18 which are interconnected by a continuous yoke 20 providing a closed flux path. More specifically, poles 16 and 18 are formed integral with legs 22 and 24, respectively, of yoke 20 and are in turn connected by a pair of legs 26 and 28. Wound upon pole 16 is a coil 30 and a similar coil 32 is provided upon pole 18. Coils 30 and 32 are connected in series and are energized by a source of alternating voltage generally designated by the numeral 34. The voltage source 34 may be of the ordinary 60 cycle type or may preferably be a thousand cycle source.

Coils 30 and 32 when energized by voltage source 34 excite magnet 14 and establish a flux field across pipe 12. Liquid or fluid in pipe 12 flows in a direction perpendicular to the force lines of the magnetic field so set up whereby to induce a voltage in the flowing liquid. This voltage appears across a pair of electrodes 36 and 38 provided in the walls of pipe 12 at opposite ends of a diameter thereof, the line interconnecting electrodes 36 and 38 being also perpendicular to the force lines of the field established across pipe 12.

Measurement of the rate of flow of liquid through pipe 12 is accomplished by measuring the voltage appearing between electrodes 36 and 38. This voltage is proportional to the flux field established across pipe 12 and the rate of flow of liquid through pipe 12. To this end a line 40 interconnects electrode 36 with a terminal 42 of a differential amplifier diagrammatically indicated at 44. Amplifier 44 is preferably electronic and may use either vacuum tubes or transistors as amplifying elements.

In determining the rate of flow through pipe 12, the circuit of FIGURE 1 compares the voltage developed between electrodes 36 and 38 with a voltage that is also proportional to the flux field established across pipe 12. More specifically, leg 28 of magnet 14 is provided with a coil 46. Coil 46 has induced in it a voltage which is 90 degrees out of phase with the voltage induced between electrodes 36 and 38 and proportional to the flux field across pipe 12. Accordingly, the voltage induced in coil 46 is first phase shifted to produce a signal in phase with the flow signal between electrodes 36 and 38 and is then compared with the flow signal through means of a self-balancing potentiometer including the differential amplifier 44 and a two-phase motor generally designated by the numeral 48.

One end of coil 46 is connected through a wire 50 to one terminal of a capacitor 52 and the other terminal of capacitor 52 is connected through a wire 54 to one end of a resistor 56. The other end of resistor 56 is connected through a wire 58 to the other end of coil 46. Capacitor 52 and resistor 56 serve as an integrating or phase shifting circuit to provide a voltage across resistor 56 which is proportional to the voltage induced in coil 46 but 90 degrees out of phase therewith.

A voltage divider network including a first resistor 60 and a potentiometer resistor 62 is connected across resistor 56. More specifically one end of resistor 60 is connected through a line 64 to the end of resistor 56 connected with line 54. The other end of resistor 60 is connected to one end of resistor 62. The other end of resistor 62 is connected through a line 66 to the end of resistor 56 connected with coil 46. Electrode 38 is also connected through a wire 68 to the junction between resistors 56 and 62.

The differential amplifier 44 has the other terminal 70 thereof connected through a line 72 to make electrical contact with a slider 74 which in turn contacts resistor 62. It will be seen therefore, that the voltage appearing between electrodes 36 and 38 is applied to the input terminals 42 and 70 of amplifier 44 in series with that portion of resistor 62 lying between slider 74 and the connection with line 66.

The output from differential amplifier 44 appears at terminals 76 and 78 and is applied to one coil 80 of the two-phase motor 48. The other coil 82 of motor 48 is movable and is energized from any suitable alternating current source such as the standard 60 cycle 110 volt line. Mechanical interconnection is made between coil 82 and slider 74 whereby movement of coil 82 will move slider 74 along resistor 62 to make electrical contact therewith at different points therealong.

Amplifier 44 being of the differential type will amplify a signal corresponding to the difference between the voltage appearing across the portion of the potentiometer 62 lying between slider 74 and line 66 and the flow signal appearing between electrodes 36 and 38. This difference signal is amplified and the amplified signal used to energize coil 80. Energization of coil 80 causes coil 82 to move whereby to adjust the position of slider 74. As long as a difference exists between the flow signal appearing across electrodes 36 and 38 and the portion of the potentiometer between slider 74 and line 66, the motor 48 will move slider 74 in a direction which reduces this difference to zero. When the difference has been reduced to zero, the motor 48 will stop. In this position the voltage appearing between slider 74 and line 66 will be equal to the flow signal voltage across terminals 36 and 38. This voltage can be expressed in terms of the position of slider 74 along potentiometer resistor 62.

The value of the flow signal appearing across electrodes 36 and 38 can be determined directly from the physical constants of the flowmeter. The manner in which the value of the signal can be computed will now be demonstrated. As explained previously the flow signal appearing between electrodes 36 and 38, which will hereafter be designated $e_f$, is given by the equation:

$$e_f = K_1 \phi u d \quad (1)$$

This equation states that the flow signal is proportional to the intensity of the magnetic field, $\phi$, to the velocity, $u$, of the liquid and to the diameter, $d$, of the flow tube 12. $K_1$ is a proportionality factor dependent upon the geometry of the system.

The induced voltage in coil 46, referred to hereinafter as $e_i$, is proportional to the first derivative of the field intensity and the value thereof can be mathematically expressed by the following equation wherein $K_2$ is a proportionality factor:

$$e_i = K_2 \frac{d\phi}{dt} \quad (2)$$

When the exciting field set up by voltage source 34 is sinusoidal, Equations 1 and 2 can be rewritten as Equations 3 and 4, respectively, as follows:

$$e_f = K_1 \phi \sin \omega t d \quad (3)$$

$$e_i = K_2 \phi \cos \omega t \quad (4)$$

Figure 2:
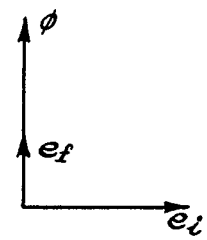
FIGURE 2 is a vector diagram illustrating the phase relationship among the voltage exciting the magnetic field, the flux produced by the exciting voltage and a voltage induced by the flux of the exciting field.

From the above equations it is seen that there is a 90 degree phase difference between the flow signal $e_f$ appearing across electrodes 36 and 38 and the voltage $e_i$ induced in coil 46. This is illustrated diagrammatically in FIGURE 2 of the drawing where it is further seen that the flow signal $e_f$ is also in phase with the induced field $\phi$. In order to use the voltage $e_i$ induced in coil 46 as a reference voltage, it is necessary to shift the phase thereof until it is in phase with flow signal $e_f$. This can be done by integration as can be illustrated mathematically by the following equation:

$$\int e_i dt = K_2 \phi \sin \omega t \quad (5)$$

Such an integration is accomplished by means of the integrating circuit including capacitor 52 and resistor 56. The voltage appearing across resistor 56, hereinafter referred to as $e_3$, can be expressed as follows:

$$e_3 = \int e_i dt = e_i \sin \omega t \quad (6)$$

The rate of flow, $u$, can be expressed in terms of the flow signal $e_f$ and induced signal $e_i$ in coil 46 by combining Equations 5 and 6 with Equation 1 as follows:

$$u = \frac{K_2 e_f}{K_1 e_i} d = K_3 \frac{e_f}{e_i} d \quad (7)$$

The self-balancing potentiometer assembly including differential amplifier 44, motor 48, resistor 62 and slider 74 serve to move slider 74 to a point such that the potential between slider 74 and line 66 is equal to the flow signal, $e_f$, across electrodes 36 and 38. The flow signal can, therefore, be expressed in terms of the various resistances and the voltage induced in coil 46 by the following equation:

$$e_f = p \frac{r}{r + R} e_3 \quad (8)$$

Wherein $r$ denotes the resistance of the potentiometer resistor 62, R denotes the value of the series resistor 60 and $p$ denotes in percent the position of the slider from the end of resistor 62 connected to line 66 at which motor 48 comes to a stop. Combining Equations 7 and 8:

$$u = \frac{K_3 \cdot p \cdot r \cdot d \cdot e_3}{(r + R) \cdot e_i} \quad (9)$$

Since the values of $r$, R and $d$ are fixed, and $e_3$ and $e_i$ are both proportional to the field $\phi$, Equation 9 can be rewritten:

$$u = K_5 p \quad (10)$$

It has been mathematically demonstrated therefore, that the rate of flow of liquid through pipe 12 can be accurately expressed as a percentage of the distance that slider 74 is removed from the junction between resistor 62 and line 66. The accuracy of the system, therefore, depends only upon the linearity of potentiometer resistor 62. Such resistors can be readily made with a high degree of accuracy.

Certain error voltages may also be induced in the flowing liquid to be measured between electrodes 36 and 38. These error voltages are usually not directly related to the flow signal and represent an error in the flow rate indicated particularly at zero flow. Certain error voltages are electrostatically and magnetically induced voltages in the liquid being measured and in the loops formed by the electrode connections. Generally these voltages are 90 degrees out of phase with the exciting field and consequently with any direct flow signal which results from actual flow of liquid. In most cases these error voltages in addition will have a component in phase with the direct flow signal due to the losses induced in the magnet core and the asymmetrical distribution of the magnetic flux across the faces of poles 16 and 18 and across the cross section of the magnetic path of the yoke 20. There is shown in FIGURE 3 of the drawings a modified form of the present invention including means to eliminate error signals by providing means to make symmetrical the distribution of the losses in the magnet and by cancelling certain of the error voltages due to the previously existing asymmetry.

Another phase shifting network is also illustrated in FIGURE 3 of the drawings, this phase shifting network permitting the selection of any phase between zero degrees and 180 degrees with constant amplitude.

Referring to FIGURE 3 of the drawing there is shown another preferred form of a flowmeter generally designated by the numeral 90 made in accordance with and embodying the principles of the present invention. The fluid to be measured is confined in a pipe or conduit 92 similar in construction to pipe 12 described above and is preferably formed of nonmagnetic material such as a suitable plastic. Pipe 92 has also been illustrated as being circular in cross section. There is disposed about pipe 92 an electromagnet generally designated by the numeral 94. Electromagnet 94 includes a pair of poles 96 and 98 which are disposed on opposite sides of pipe 92 and are interconnected by a continuous yoke 100 formed of magnetic material as are the poles 96 and 98. More specifically, poles 96 and 98 are formed integral with legs 102 and 104, respectively, of yoke 100 and are in turn connected by a pair of legs 106 and 108. A coil 110 is wound upon pole 96 and a similar coil 112 is wound upon pole 98. The coils 110 and 112 are connected in series and are energized by a source of alternating voltage generally designated by the numeral 114. The voltage source 114 may be of the 60 cycle type or preferably may be a thousand cycle source.

When energized by voltage source 114, coils 110 and 112 excite magnet 94 and establish across pipe 92 a suitable flux field. The fluid or liquid in pipe 92 flows in a direction perpendicular to the force lines of the magnetic field whereby to thread the field at right angles and thereby to induce a voltage in the flowing liquid. This induced voltage appears across or between a pair of electrodes 116 and 118 which are provided in the walls of pipe 92 on opposite ends of a diameter thereof. A line interconnecting electrodes 116 and 118 is also perpendicular to the force lines of the field established across pipe 92 whereby to provide maximum voltage therebetween.

The measurement of the flow of liquid through pipe 92 is accomplished in a manner similar to that described above with respect to flowmeter 10. More specifically, the voltage between electrodes 116 and 118 is a signal voltage proportional to the rate of flow of liquid in pipe 92. In this form of flowmeter the flow signal is also compared with a voltage induced in a coil wound about yoke 100 by means of a self-balancing potentiometer including a differential amplifier diagrammatically represented at 120. More specifically, a line 122 interconnects electrode 116 with input terminal 124 of amplifier 120. Amplifier 120 is preferably of an electronic type as was amplifier 44 described above and may use either vacuum tubes or transistors as amplifying elements.

As was the case with respect to flowmeter 10 above, the rate of flow through pipe 92 is determined by comparing the voltage developed between electrodes 116 and 118 with a voltage that is also proportional to the flux field established across pipe 92. More specifically, in this form of the invention legs 106 and 108 are each provided with a coil 126 and 128, respectively. Coils 126 and 128 are connected in series with each other and also in series with a resistor 130 having an adjustable contact 132 thereon. Resistor 130 may be in the form of a potentiometer with contact 132 being the slider thereon. More specifically, one end of coil 126 is connected through a line 134 to slider 132 and one end of coil 128 is also connected through a line 136 to slider 132. The other end of coil 126 is connected through a line 138 to one end of the potentiometer resistor 130. Similarly the other end of coil 128 is connected through a line 140 to the other end of potentiometer resistor 130.

By adjusting the position of the slider 132 along resistor 130, the losses on both sides of the magnet 94 can be equalized. Thus certain error signals resulting from asymmetry of the magnet can be eliminated by means of the potentiometer 130 and the associated slider 132.

Coils 126 and 128 also form a part of the phase shifting network. More specifically, line 138 is also connected to a line 142 which connects with a variable resistor 144. Line 140 connects with a capacitor 146 and resistor 144 and capacitor 146 are connected to each other at point 148. The voltage induced in coils 126 and 128 is 90 degrees out of phase with the flux field flowing through yoke 100 when voltage source 114 is sinusoidal in character. Resistor 144 and capacitor 146 provide a phase shifting network in conjunction with the center tapped coils 126 and 128 whereby to shift the phase of the voltage induced in coils 126 and 128 to any value between zero and 180 degrees without changing the amplitude thereof. This is diagrammatically illustrated in FIGURE 4 of the drawings wherein the arrows indicate the constant amplitude signal voltage, $e_1$, which may have any of the indicated phase positions from zero to 180 degrees.

A voltage dividing network is provided across the phase shifting network and includes a first resistor 150 and a potentiometer resistor 152 forming a part of the self-balancing potentiometer and having a slider 154 providing contact therewith at any point along the length thereof. More specifically, one end of resistor 150 is connected to point 148 and the other end of resistor 150 is connected to one end of the potentiometer resistor 152. The other end of resistor 152 is connected through a line 156 to electrode 118 in the wall of pipe 92. A line 158 also connects line 136 connected to coil 128 to line 156 and the connected end of potentiometer resistor 152.

Connection is made from the slider 152 through a line 160 to the second input terminal 162 on the differential amplifier 120.

The voltage induced in coils 126 and 128 is first phase shifted and then compared with the voltage developed between electrodes 116 and 118. The flow signal between electrodes 116 and 118 and the induced voltage in coils 126 and 128 are fed to the differential amplifier 120 as the inputs thereto. The differences between these voltages is then amplified and the amplified signal fed to the output terminals 164 and 166 of amplifier 120. Terminals 164 and 166 are in turn connected to the stationary coil 168 of a two-phase motor generally designated by the numeral 170. The other coil 172 of motor 170 is movable and preferably energized from any suitable source such as a standard 60 cycle 110 volt line. Mechanical interconnection is also made between coil 172 and the slider 154 which contacts potentiometer resistor 152.

Since amplifier 120 is of the differential type, a signal equal to the difference between the flow signal appearing across electrodes 116 and 118 and the fraction of the voltage induced in coils 126 and 128 appearing on potentiometer 152 will be amplified. This amplified signal then serves to drive motor 170 and move slider 154 along resistor 152 in a direction to reduce this difference voltage to zero. As long as a difference voltage exists, motor 170 will move slider 154 toward the zero voltage difference position. When the difference has been reduced to zero, the motor 170 will stop. In this position the voltage appearing between slider 154 and line 156 will be equal to the flow signal voltage between terminals 116 and 118. This voltage can be expressed in terms of the position of slider 154 along potentiometer resistor 152 in the same manner as has been described above with respect to flowmeter 10 (see particularly Equation 10 above).

The phase shifting network including coils 126 and 128, resistor 130 and the associated slider 132, the variable resistor 144 and the capacitor 146 accurately shifts the phase of the voltage induced in coils 126 and 128. By adjusting resistor 144, the phase of the induced voltage in coils 126 and 128 can be accurately adjusted to be exactly in phase with the flow signal appearing between electrodes 116 and 118. In addition, the provision of two coils 126 and 128 which are connected in series with potentiometer resistor 130 and slider 132 permits equalization of the sides of magnet 94 and results in cancellation of errors due to asymmetry of electromagnet 94.

Often it is desirable to obtain a record of the totalization of the flow through conduit 92 over a relatively long period of time. Such a totalization can be accomplished by means of a totalizing circuit shown in FIGURE 3 which includes an auto-transformer designated by the numeral 174. Transformer 174 is preferably of the type made by the General Radio Company under the trade name "Variac." A slider 176 is provided along transformer 174 to make contact at any desired point therealong. Mechanical connection is made between the movable coil 172 of motor 170 and slider 176 so that slider 176 is moved by motor 170. The position of slider 176 on coil 172 is so adjusted with respect to the position of slider 154 along potentiometer resistor 152 that the zero position of slider 154 corresponds to zero voltage between the output terminals of transformer 174. The movement of slider 176 along coil 174 is coordinated with the movement of slider 154 along resistor 152 so that the slider 176 is always at a potential point to produce an output from transformer 174 that is the same percentage of the total potential possible from transformer 174 as the potential point of slider 154 with respect to the total potential available across resistor 152.

The output from transformer 174 is utilized to drive a watt-hour meter generally designated by the numeral 178. More specifically, a line 180 makes electrical connection from slider 176 to one end of the voltage coil 182 of meter 178. The auto-transformer 174 and the current coil 184 of meter 178 are both powered from a suitable source such as a 60 cycle 110 volt power supply. Preferably a voltage regulator tube 186 is inserted in the line supplying current coil 184 so that a constant current is applied thereto.

With the above described arrangement, the disc of the watt-hour meter 178 will at any time rotate with a speed directly proportional to the position of slider 176 along transformer 174 and to the position of slider 154 along resistor 152. Means may be provided to count the revolutions of the watt-hour meter disc and the total of the revolutions will be a correct indication of the total flow during the time interval counted. Any suitable means such as a photo-electric counter or a magnetic counter may be used to count the revolutions of the indicator disc of the watt-hour meter 178.

It will be seen that there have been provided improved flowmeters which provide all of the advantages and satisfy all the objects set forth above. More specifically, there have been provided flowmeters which are absolute instruments in the sense that no external standard references are needed for calibration, the calibration of the instrument being possible in terms of the physical and electrical constants thereof. Such flowmeters are inherently more accurate and are less expensive to manufacture and operate since the need for external calibrating references is eliminated. All parts except the potentiometers 62 and 152 can be of standard types with no special effort to provide linear components. More specifically, no linear amplifiers need be used since only difference signals are amplified. The potentiometer resistors 62 and 152 can be readily manufactured with a high degree of accuracy thereby making the flowmeters accurate. These flowmeters are substantially independent of variations in the voltage source for the exciting magnetic field and are substantially independent of variations in the ambient temperature and variations in the magnetic properties of the exciting magnet and other component parts.

Although certain preferred forms of the invention have been shown for purposes of illustration, it is to be understood that various changes and modifications can be made therein without departing from the spirit and scope of the invention. Accordingly, the invention is to be limited only as set forth in the following claims.

I claim:

1. Apparatus for measuring fluid flow comprising a conduit for carrying a flowing fluid, electromagnetic means for establishing an alternating magnetic field through a section of said conduit, a plurality of electrodes electrically contacting a fluid flowing in said conduit to detect a potential induced in the fluid, means to provide a reference signal potential proportional to and in phase with said magnetic field, a potentiometer having a slider making contact therewith connected so that a portion of said reference signal potential appears thereacross, a differential amplifier having applied as inputs thereto the potential on said potentiometer at the point of contact with said slider and the potential induced in the fluid, a motor electrically connected to said amplifier, said amplifier amplifying the difference between the input potentials thereto and applying the amplified signal as an input to said motor, first means interconnecting said motor and said slider to move said slider to a potential point on said potentiometer proportional to the potential induced in the fluid, an auto-transformer having a second slider making contact therewith, second means interconnecting said motor and said second slider to move said second slider to a point producing an output from said autotransformer proportional to the potential induced in the fluid, and a totalizing device responsive to the position of said second slider to totalize the fluid flow through said conduit.

2. Apparatus for measuring fluid flow comprising a conduit for carrying a flowing fluid, electromagnetic means for establishing an alternating magnetic field through a section of said conduit, a plurality of electrodes electrically contacting a fluid flowing in said conduit to detect a potential induced in the fluid, means to provide a reference signal potential proportional to and in phase with said magnetic field, a potentiometer having a slider making contact therewith connected so that a portion of said reference signal potential appears thereacross, a differential amplifier having applied as inputs thereto the potential on said potentiometer at the point of contact with said slider and the potential induced in the fluid, a motor electrically connected to said amplifier, said amplifier amplifying the difference between the input potentials thereto and applying the amplified signal as an input to said motor, first means interconnecting said motor and said slider to move said slider to a potential point on said potentiometer proportional to the potential induced in the fluid, an auto-transformer having a slider making contact therewith, second means interconnecting said motor and said auto-transformer slider to move said slider to a point producing an output from said auto-transformer proportional to the potential induced in the fluid, a watt-hour meter connected to the output of said auto-transformer, said watt-hour meter having an indicating disc, and means to count the revolutions of said indicating disc to totalize the fluid flow to said conduit.

3. Apparatus for measuring fluid flow comprising a conduit for carrying a flowing fluid, electromagnetic means including a first coil and a magnetic yoke having two substantially symmetrical legs, said first coil inducing a magnetic flux in said yoke to establishing an alternating magnetic field through a portion of said conduit, a plurality of electrodes electrically connecting with a fluid flowing in said conduit to detect the potential induced in the fluid, a second coil threaded by at least a part of the flux established in one of said legs and a third coil threaded by at least a part of the flux established in the other of said legs, said second and third coils being connected in series circuit with each other and with a phase shifting network including a capacitor and a variable resistor connected in series with each other and with said second and third coils, and a self-balancing potentiometer for comparing the potential induced in the fluid and the voltage from said phase shifting network to measure the rate of fluid flow through said conduit.

4. Apparatus for measuring fluid flow comprising a conduit for carrying a flowing fluid, electromagnetic means including a first coil and a magnetic yoke having two substantially symmetrical legs, said first coil inducing a magnetic flux in said yoke to establish an alternating magnetic field through a portion of said conduit, a plurality of electrodes electrically connecting with a fluid flowing in said conduit to detect the potential induced in the fluid, a second coil threaded by at least a part of the flux established in one of said legs and a third coil threaded by at least a part of the flux established in the other of said legs, said second and third coils being connected in series circuit with each other and with a phase shifting network including a capacitor and a variable resistor connected in series with each other and with said second and third coils, a potentiometer including a slider making contact therewith connected across said phase shifting network, means comparing a portion of the voltage appearing across said potentiometer with the potential induced in the fluid, and means responsive to said comparing means for moving said slider to a point on said potentiometer equal in potential to the potential induced in the fluid to measure the rate of flow of fluid in said conduit.

5. Apparatus for measuring fluid flow comprising a conduit for carrying a flowing fluid, electromagnetic means including a first coil and a magnetic yoke having two substantially symmetrical legs, said first coil inducing a magnetic flux in said yoke to establish an alternating magnetic field through a portion of said conduit, a plurality of electrodes electrically connecting with a fluid flowing in said conduit to detect the potential induced in the fluid, a second coil threaded by at least a part of the flux established in one of said legs and a third coil threaded by at least a part of the flux established in the other of said legs, said second and third coils being connected in series circuit with each other and with a potentiometer having a slider in contact therewith, said slider also being in electrical contact with a point at the interconnection of said second and third coils to balance said legs, a phase shifting network including a capacitor and a variable resistor connected in series with each other and with said potentiometer, and a self-balancing electronic potentiometer to compare the potential induced in the fluid and the voltage from said phase shifting network to measure the rate of fluid flow through said conduit.

6. Apparatus for measuring fluid flow comprising a conduit for carrying a flowing fluid, electromagnetic means including a first coil and a magnetic yoke having two substantially symmetrical legs, said first coil inducing a magnetic flux in said yoke to establish an alternating magnetic field through a portion of said conduit, a plurality of electrodes electrically connecting with a fluid flowing in said conduit to detect the potential induced in the fluid, a second coil threaded by at least a part of the flux established in one of said legs and a third coil threaded by at least a part of the flux established in the other of said legs, said second and third coils being connected in series circuit with each other and with a phase shifting network including a capacitor and a variable resistor connected in series with each other and with said second and third coils, a potentiometer having a slider making contact therewith and connected across said variable resistor, a differential amplifier having applied as inputs thereto the potential on said potentiometer at the point of contact with said slider and the potential induced in the fluid, a motor electrically connected to said amplifier, said amplifier amplifying the difference between the input potentials thereto and applying the amplified signal as the input to said motor, and means interconnecting said motor and said slider to move said slider to a potential point on said potentiometer proportional to the potential induced in the fluid.

7. Apparatus for measuring fluid flow comprising a conduit for carrying a flowing fluid, electromagnetic means including a first coil and a magnetic yoke having two substantially symmetrical legs, said first coil inducing a magnetic flux in said yoke to establish an alternating magnetic field through a portion of said conduit, a plurality of electrodes electrically connecting with a fluid flowing in said conduit to detect the potential induced in the fluid, a second coil threaded by at least a part of the flux established in one of said legs and a third coil threaded by at least a part of the flux established in the other of said legs, said second and third coils being connected in series circuit with each other and with a phase shifting network including a capacitor and a variable resistor connected in series with each other and with said second and third coils, a potentiometer having a slider making contact therewith and connected across said variable resistor, a differential amplifier having applied as inputs thereto the potential on said potentiometer at the point of contact with said slider and the potential induced in the fluid, a motor electrically connected to said amplifier, said amplifier amplifying the difference between the input potentials thereto and applying the amplified signal as the input to said motor, means interconnecting said motor and said slider to move said slider to a potential point on said potentiometer proportional to the potential induced in the fluid, and means driven by said motor to totalize the fluid flow through said conduit.

References Cited in the file of this patent

UNITED STATES PATENTS

| | | |
|---|---|---|
| 2,510,467 | Fuge | June 6, 1950 |
| 2,696,737 | Mittelmann | Dec. 14, 1954 |
| 2,729,103 | Raynsford et al. | Jan. 3, 1956 |
| 2,757,538 | Soffel | Aug. 7, 1956 |
| 2,844,568 | Mertz | July 22, 1958 |

OTHER REFERENCES

Alternating Current Circuits: Kerchner & Corcoran, third edition, Wiley & Sons, 1951 (page 236). Copy in Division 36, U.S. Patent Office.